Patented Aug. 14, 1928.

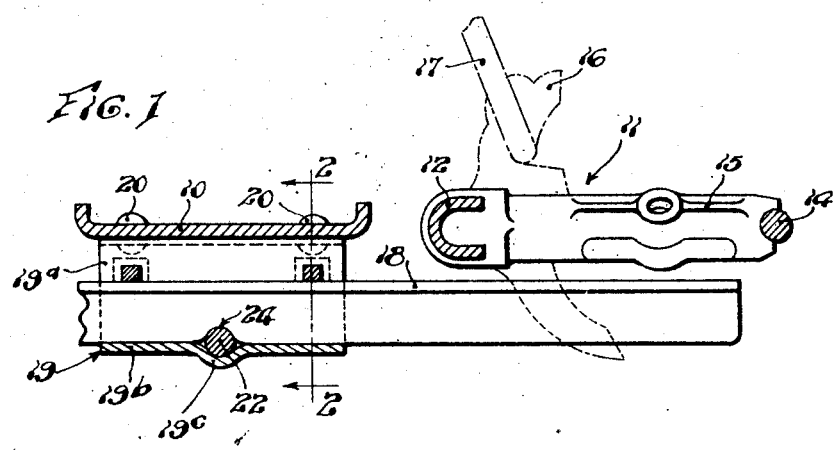
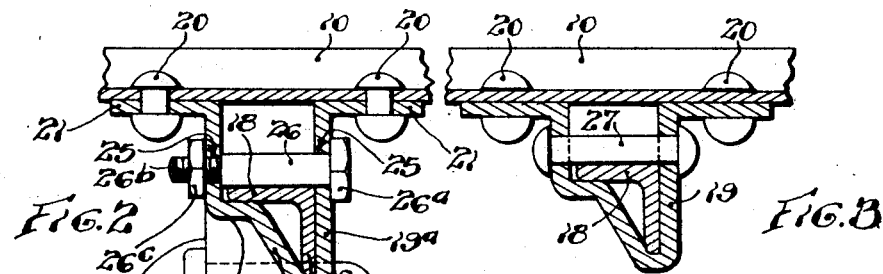
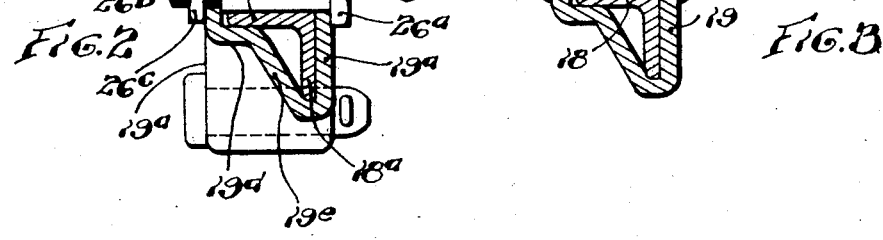
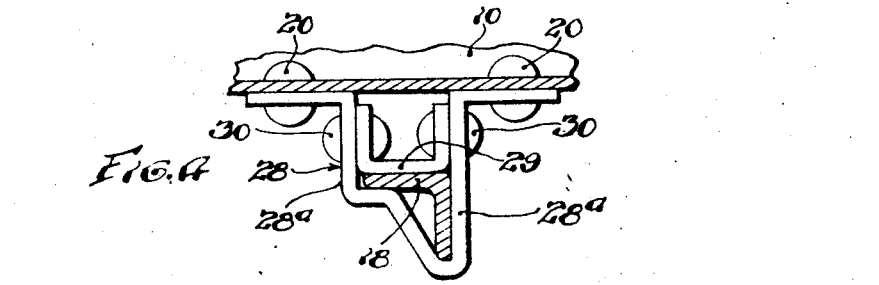

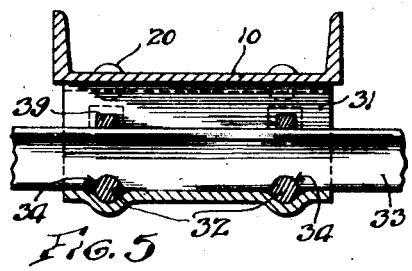
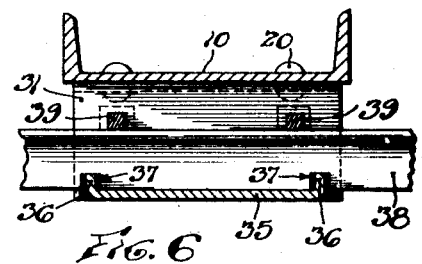
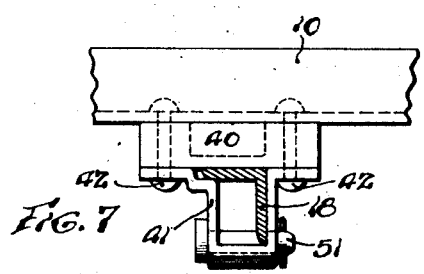
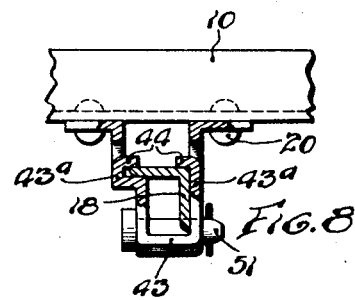
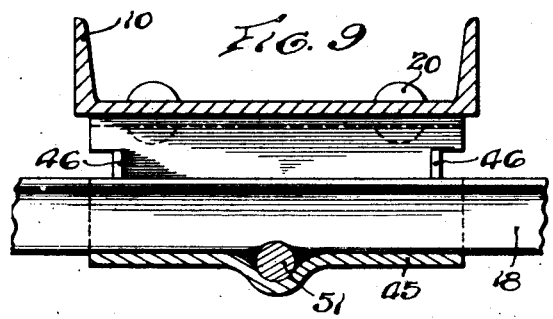
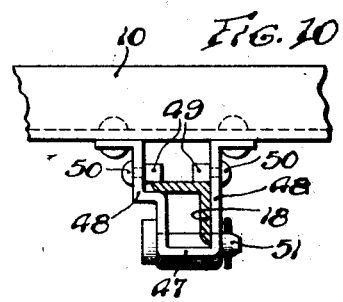
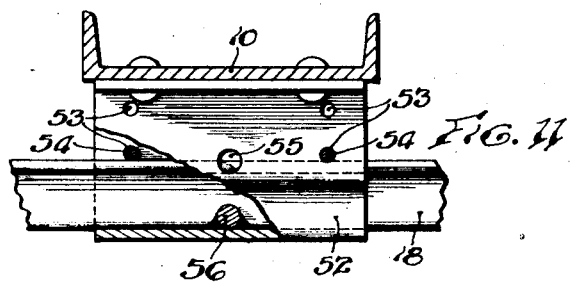

1,680,448

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

MOUNTING FOR BRAKE-BEAM SAFETY BARS.

Application filed April 12, 1926. Serial No. 101,394.

This invention relates to new and useful improvements in means for supporting the brake beam safety guards and supports and is a continuation in part of an application filed by me October 26, 1925, Serial No. 64.996.

The objects of the present invention are to maintain the safety bar in fixed relation with the supporting bracket and the member utilized to lock the bar against longitudinal movement and in spaced relation with the car truck carrying said supporting bracket.

Further objects of the invention are to provide a supporting bracket having an element adapted to engage the underside of the safety bar and having another element adapted to engage the top of said safety bar thereby locking said safety bar against longitudinal and vertical movement, one of said elements being removable to permit assembly of said safety bar.

With these and other objects in view my invention consist of certain novel features of construction and arrangement of parts hereinafter more fully described and claimed, and illustrated in the accompanying drawings, in which:—

Figure 1 is a side elevational view of a safety bar showing the spring plank and the means for engaging said bar in cross section.

Figure 2 is a vertical cross section taken on line 2—2 of Figure 1.

Figure 3 is a vertical cross section showing modified form of my invention.

Figure 4 is a vertical cross section showing another modified form of my invention.

Figure 5 is a longitudinal cross section through the bracket showing modified means for securing the safety bar or auxiliary support in position.

Figure 6 is a similar view showing still another modified form of interlocking the brake beam safety bar in position on the bracket.

Figures 7 to 11 show still other modified forms of my invention.

Referring by numerals to the accompanying drawings, 10 indicates a spring plank, 11 indicates a brake beam comprising a compression member 12, a tension member 14 and a strut 15. A brake head 16 is supported on each side of the brake beam and engaging each brake head is a hanger 17 which operatively supports the brake beam in position.

Extending under the brake beam is a safety bar 18 which forms a guard or safety support for said brake beam. This safety bar is supported by a mounting 19 which is preferably U-shaped in cross section and is secured to the underside of a spring plank 10 by suitable fastening devices 20. This mounting or bracket is provided with horizontally disposed side flanges 21 which are apertured to receive said fastening devices 20.

A pin 22 is disposed transversely in the lower portion of mounting 19 and preferably spaced equal distances from the ends of said bracket, there being suitable apertures formed in the side walls $19^a$ for the reception of said pin. The underside of bar 18, which in the present instance is in the form of an angle but may be of any desired shape, is provided with a downwardly opening recess or seat 24 which when pin 22 is placed in position is engaged by said pin thereby locking bar 18 against longitudinal movement. The bottom wall $19^b$ of mounting 19 is formed with a transverse depression $19^c$ for receiving the lower portion of pin 22.

The walls $19^a$ are provided with aligned apertures 25 disposed equi-distant to each side of the locking pin 22. A pin 26 is seated in each pair of aligned apertures 25 and bears on top of bar 18 thereby preventing upward movement of said bar and maintaining it in interlocked relation with pin 22. Pins 26 which are removable are preferably rectangular in cross section and are provided at one end with a square head $26^a$ while the opposite end terminates in a threaded portion $26^b$ which extends through the respective aperture in the side wall of $19^a$ and receives a nut $26^c$. When safety bar 18 is in the form of angle-iron, one of the walls $19^a$ of bracket 19 is bent inwardly to provide a horizontal portion $19^d$ which forms a support for the horizontally disposed flange $18^b$ of bar 18, and the remaining lower portion of wall $19^a$ inclines downwardly, as indicated at $19^e$, towards the lower end of the opposite wall $19^a$ so as to form a snug seat for the edge of vertically disposed flange of $18^a$.

In the form shown in Figure 3, in place of removable bolts, 26, a rivet 27 is used to bear on top of safety bar 18, otherwise the construction is the same as in the preceding form.

The form shown in Figure 4 shows bar 18 rigidly supported by brackets or mountings 28, there being a transverse member 29 disposed between the walls 28ª of said bracket, the ends of said transverse member being secured to said wall by suitable fastening devices 30. In this form the element bearing on top of the safety bar is permanently secured in position in the bracket, the locking element 22 being removable to permit assembly of the safety bar in position.

In the form shown in Figure 5, a bracket 31 is provided with two seats for receiving two removable pins 32 and safety bar 33 is formed in its underside with a pair of seats 34 for engagement with pins 32.

The form disclosed in Figure 6 shows a bracket 35 provided at its ends with upturned lips 36 which are adapted to enter downwardly presented notches 37 of a safety bar 38, thereby holding the latter against longitudinal movement. Pins 39 bear on top of bar 38 and hold said bar in interengagement with the projections of the bracket thereby securing said bar against movement in horizontal and vertical plane. Pins 39 are removable to permit attachment and detachment of the safety bar.

In the form shown in Figure 7 a spacer 40 is interposed between bracket 41 and spring plank 10, both the bracket and spacer are secured to the spring plank by suitable fastening devices 42.

The form shown in Figure 8 discloses a bracket 43 the side walls 43ª of which are formed with inwardly projecting lips or portions 44 which engage the top of the safety bar 18 and space the latter from the spring plank.

In the form shown in Figure 9 a bracket 45 has portions of its end edges bent inwardly to form lateral projections 46 to engage the top of safety bar 18.

In Figure 10 a bracket 47 has projecting inwardly from its side walls 48 projections or pins 49 which are secured in position in any suitable manner such as by upsetting the reduced ends thereof as indicated at 50. Projections 49 limit the extent of upward movement of safety bar 19 and maintain it in interlocked relation with the locking pin 51.

In the form shown in Figure 11 a bracket 52 is provided in its walls with a series of apertures 53 disposed in vertical plane for selectively receiving pins 54 which are designed to bear on top of the safety bar 18 and said bracket is also provided with a series of apertures 55 also arranged in vertical plane and in predetermined relation with apertures 53 to selectively receive locking pin or pins 56 in correlation with pins 54.

By my improved construction a brake beam safety bar is rigidly held in position in spaced relation with the spring plank and is held both against vertical and horizontal movement.

I claim:

1. A mounting for a brake beam safety bar having spaced side walls and provided with a series of apertures spaced in a vertical plane and adapted to receive a safety bar locking pin, and a plurality of apertures spaced in vertical planes in definite relation with the first apertures and adapted to selectively receive means for bearing on top of said safety bar when the latter is engaged by said locking pin.

2. A support for a brake beam safety bar comprising a bracket adapted to be secured to a truck part, a safety bar, a locking pin carried by said bracket and engaging a downwardly presented seat on said bar for locking the latter against longitudinal movement, and means carried by said bracket and bearing on top of said bar for preventing upward movement thereof, said bracket being provided with a plurality of apertures arranged in a vertical row for selectively receiving said locking pin whereby said bar can occupy positions in said bracket in different horizontal planes, said bracket being further provided with a series of apertures disposed in vertical rows for receiving said means and spacing the latter in correlation with the position occupied by said bar.

3. In a support for brake beams, an upright U-shaped bracket, a bar arranged in said bracket and extending therefrom, a bar positioning member extending transversely of said bracket, and means carried by the sides of said bracket and bearing on top of said bar for holding said bar immovable in said bracket.

4. A support for brake beams, the combination of a truck part, an upright U-shaped bracket secured thereto, a bar arranged in said bracket and spaced from said truck part and adapted to extend under a brake beam, a member in said bracket engaging a seat formed in said bar to prevent the longitudinal movement thereof, and an element carried by said bracket and spaced from said truck part and said member, said element bearing against said bar and locking it in interengaged relation with said member.

5. In a support for brake beams, a bracket adapted to be attached to a truck part, a brake beam support bar carried by said bracket and spaced below the top of said bracket, means carried by said bracket for engaging the underside of said bar and locking it against longitudinal movement, and a member bearing on top of said bar for maintaining the latter in engagement with said means.

6. In a support for brake beams, a car truck part, an upright U-shaped bracket, means attaching said bracket to said truck part, a brake beam safety bar seated in said bracket below the level of said means, a member in said bracket for locking said bar against longitudinal movement, and an element carried by said bracket independently of said means in spaced relation to said member for engaging the opposite side of said bar to prevent the movement thereof in a vertical direction.

7. In a support for brake beams, the combination of a bracket adapted to be attached to a truck part, a brake beam support bar seated in said bracket, removable means extending transversely of said bracket and engaging the underside of said bar for locking the latter against longitudinal movement, and means secured to the side walls of said bracket and engaging the top of said bar for maintaining the latter in fixed relation to said removable means.

8. In a support for brake beams, the combination of an upright U-shaped bracket adapted to be secured to a spring plank and having a seat for receiving a safety bar, a pin removably disposed in said bracket and adapted to engage the middle of the underside of said bar and hold it against longitudinal movement, and pins extending transversely of said bracket and spaced longitudinally of said bar and having their ends seated in the side walls thereof for engaging the top of said safety bar to prevent vertical movement thereof.

9. In a support for brake beams, the combination with a truck part, of a bracket secured thereto, a brake beam support bar seated therein, means holding the underside of said bar against horizontal movement relative to said bracket, and a member extending between and having its ends secured to the side walls of said bracket and bearing on top of said bar for holding the latter in interengaged relation with said bracket.

10. A support for brake beams comprising in combination with a truck part, a U-shaped bracket secured thereto, a safety bar spaced from said truck part and seated in said bracket and having its underside engaged to prevent its horizontal movement relative to said bracket, and removable means disposed transversely of said bar in said bracket and spaced from said truck part for engaging the top of said bar and holding it in predetermined relation to said bracket.

11. A support for brake beams comprising a bracket adapted to be applied to the lower face of a truck part, a brake beam support bar extending through said bracket, a removable element seated in said bracket and engaging a downwardly facing surface on said bar, and a removable element seated in said bracket and engaging an upwardly facing surface on said bar.

12. A support for brake beams comprising a bracket adapted to be applied to the lower face of a truck part, a brake beam support bar extending through said bracket, a removable element seated in said bracket and spaced below the top thereof and engaging a downwardly facing surface on said bar, and a removable element seated in said bracket and engaging an upwardly facing surface on said bar.

13. A support for brake beams comprising a U-shaped bracket having outwardly extending flanges for attachment to a car truck part, a beam support bar extending through said bracket, an element seated in said bracket and engaging the downwardly facing surface on said bar, and an element seated in said bracket and engaging an upwardly facing surface on said bar.

14. A support for brake beams comprising a bracket adapted to be applied to the lower face of a truck part, a beam support bar extending through said bracket, and removable means carried by said bracket for engaging opposite sides of said bar for supporting the latter and holding it in position.

15. A support for brake beams comprising a bracket adapted to be applied to the lower face of a truck part, a beam support bar extending through said bracket, and means carried by said bracket, and adapted to be located at different heights therein, for engaging opposite sides of said bar for supporting the latter and holding it in position.

In testimony whereof I hereunto affix my signature this 30th day of March, 1926.

EDWIN G. BUSSE.